W. C. MOORE.
CONNECTING ROD BEARING.
APPLICATION FILED JAN. 20, 1915.
1,154,650.   Patented Sept. 28, 1915.
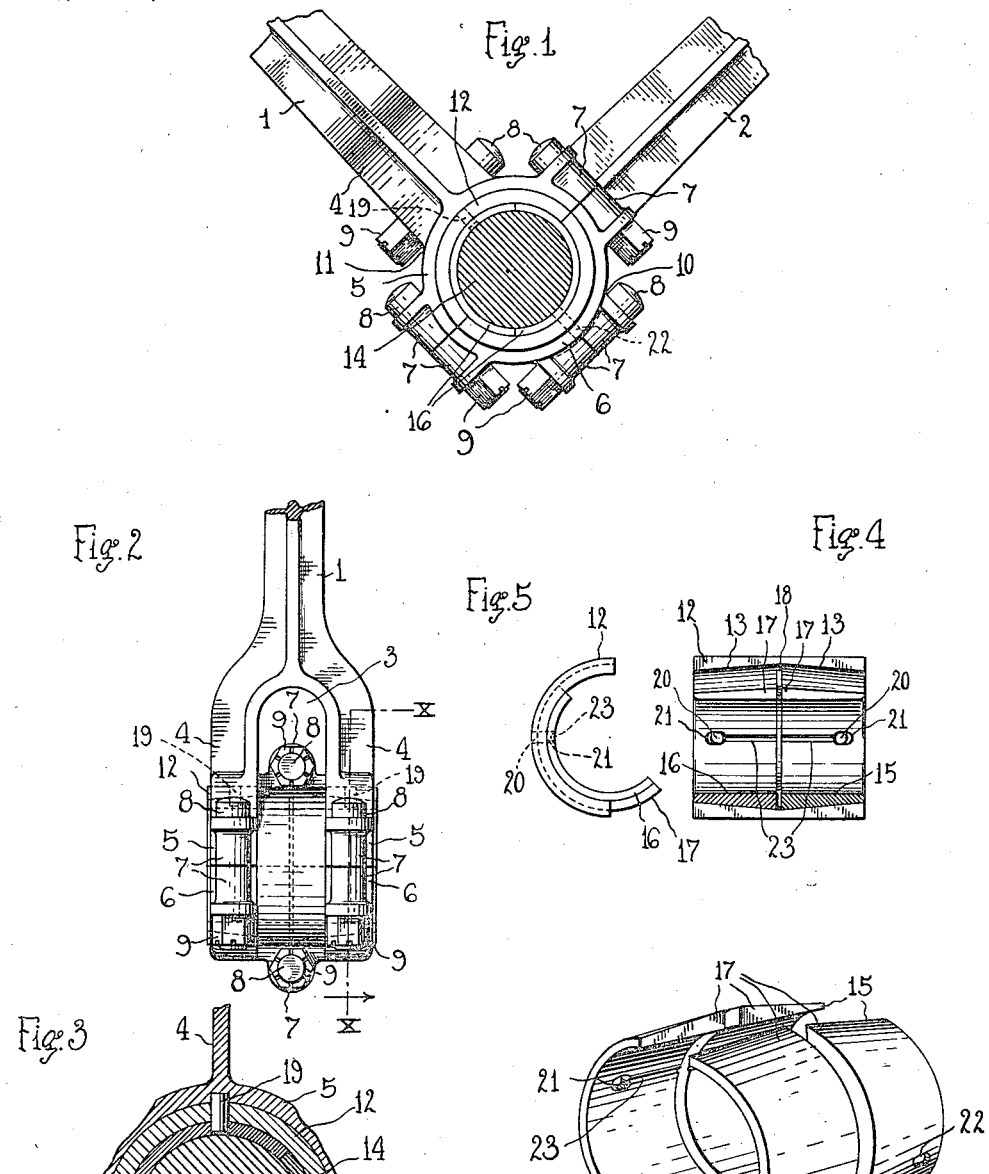

UNITED STATES PATENT OFFICE.

WILLIAM CAMPBELL MOORE, OF DETROIT, MICHIGAN.

CONNECTING-ROD BEARING.

1,154,650.   Specification of Letters Patent.   Patented Sept. 28, 1915.

Application filed January 20, 1915. Serial No. 3,406.

*To all whom it may concern:*

Be it known that I, WILLIAM CAMPBELL MOORE, a citizen of the United States of America, residing at Detroit, in the county of Wayne and State of Michigan, have invented certain new and useful Improvements in Connecting-Rod Bearings, of which the following is a specification, reference being had therein to the accompanying drawings.

This invention relates to improvements in bearings for connecting rods which are arranged in pairs with one rod of the pair forked to embrace the adjacent end of the other rod, such arrangement being particularly adapted for use in the construction of motors of the V-type wherein opposed cylinders are disposed substantially at right angles to each other and at an inclination of forty-five degrees from the vertical plane of the longitudinal axis of the crank shaft.

The primary object of my invention is to provide simple, positive and reliable means for adjusting the bearing for each rod of a pair of such connecting rods to compensate for wear, said means being adjustable from time to time to insure a proper fit of the forked rod with its crank pin and its companion rod with the bearing surface upon which it turns.

A further object of the invention is to provide an adjustable connecting rod bearing consisting of comparatively few parts, that are inexpensive to manufacture, durable, easy to assemble and highly efficient for the purpose for which they are intended.

The above and other objects are attained by a mechanical construction, hereinafter specifically described and then claimed, reference being had to the accompanying drawing, wherein—

Figure 1 is an end view of connecting rods provided with a bearing embodying the invention; Fig. 2 is a side elevation of the same; Fig. 3 is an enlarged sectional detail on the line *x—x* of Fig. 2; Fig. 4 is a longitudinal sectional view of bushing members; Fig. 5 is an end view of the same; and Fig. 6 is a perspective view of said bushing members.

In the drawing, the reference numerals 1 and 2 denote portions of connecting rods and the lower end of the connecting rod 1 is bifurcated or forked, as at 3 to provide arms 4. The ends of these arms are provided with integral bearing members 5 and removable bearing caps 6, said members and caps being of a conventional form and provided with opposing apertured lugs 7 adapted to be connected by bolts 8 having nuts 9 or similar fastening means.

The connecting rod 2 has the lower end thereof terminating in a fixed bearing member 10 and a removable bearing cap 11 connected together in a manner similar to the members 5 and 6 of the connecting rod 1. The bearing members 10 and 11 of the connecting rod 2 are disposed in alinement with and between the corresponding bearing members of the arms 4, and extending through all of said members is a longitudinally disposed split sleeve 12 which is preferably made in two sections with the sections longitudinally disposed and the confronting edges thereof in a plane substantially at right angles to the longitudinal axis of the connecting rod. The sleeve 12 is of equal external diameter throughout its length, but its inner surface is tapered inwardly, from the ends thereof to a point intermediate its ends, thereby providing two oppositely tapered surfaces 13, the purpose of which will presently appear.

Extending through the sleeve 12 is a crank pin 14 of a crank shaft and on said pin is a sectional bushing which is longitudinally and transversely divided, thereby providing opposing sections 15 and 16. The inner surfaces of the sections 15 and 16 are of uniform diameter throughout their length to fit the pin 14, but said sections are externally tapered, being of greater diameter at their inner than at their outer ends, as at 17, to correspond with the tapered or inclined inner surface of the sleeve 12. This is best shown in Fig. 4 of the drawing. With the longitudinally split sleeve 12 assembled upon the transversely and longitudinally divided bushing comprising the members 15 and 16, it is impossible for said members to become accidentally displaced when said sleeve is clamped between the bearing members and caps of the connecting rod 1 and encircled by the bearing members of the rod 2; and it is preferable to dispose the confronting longitudinal edges of the sections 15 and 16 in a different plane than that of the confronting longitudinal edges of the sleeve. (See Fig. 4). In these bearings as commonly constructed, a single plain split sleeve or bushing is used and when it or the crank pin becomes worn, the play is taken up by cutting away the confronting edges of the halves sufficiently to permit the sleeve to contract into proper engagement with the pin, but this cutting away of said edges and contracting of the sleeve, leaves its outer surface of slightly elongated form in cross-section, that is, its outer surface upon which the center connecting rod 2 turns, is no longer a true cylinder and the bearing members of said rod will not therefore, accurately fit said sleeve to turn freely thereon without any play.

It is very important in the construction of internal combustion engines that the connecting rods fit accurately the crank pins or sleeves upon which they turn, as a very slight play will soon cause a "knock" due to the continued hammering caused by the power explosions in the cylinders. When the bearing of the center rod 2 becomes worn, it is adjusted in the usual manner employed in fitting a single connecting rod to its crank pin by fitting the bearing cap to the sleeve 12 without disturbing the sleeve which therefore remains cylindrical, and if there is any play between the sleeve and the crank pin, this is taken up by adjusting the members 15 of the bushing longitudinally within the sleeve away from the members 16, which adjustment will by reason of the inclined surfaces 13, contract the bushing slightly upon the pin and take up the play. A shim in the form of a split ring 18 may be interposed between the opposed ends of the said members 15 and 16 to hold them adjusted.

To prevent the sleeve 12 from turning within the bearing members 5 of the rod 1, pins 19 are provided on said members to engage holes 20 in the corresponding half of the sleeve, and the bushing members 15 and 16 engaging said half-sleeve are held against turning by providing each with a hole 21 to also be engaged by said pins, said holes 21 being slightly elongated in the direction of the length of the bushing to permit of the longitudinal adjustment of said members. The said bushing members which fit the lower half of the sleeve may be formed in a like manner with holes 21 and the caps 6 may be formed with corresponding holes 22 to permit oil to pass therethrough into suitable grooves 23 formed in the inner surface of the members 15 and 16, leading from the holes 21 longitudinally to the inner ends of the members. The bearing is thus thoroughly lubricated and the bushing parts made in duplicate.

By the described arrangement of split sleeve and sectional bushing members, an adjustable bearing for double connecting rods working upon a common crank pin, is provided, in which the bearing surface upon which the single or center connecting rod turns may be brought into perfect conformity with the bearing of said rod and the bearing surface for the crank pin may be brought into the desired adjustment to take up any play due to wear.

Obviously, changes may be made in the construction and arrangement of parts without departing from the spirit of my invention and I do not therefore limit myself to the particular form or arrangement shown.

What I claim is:—

1. The combination with a crank pin, and connecting rod bearings, of a longitudinally divided sleeve in said bearings, and a divided bushing on said crank pin in said sleeve movable longitudinally thereof.

2. The combination with a crank pin and connecting rod bearings, of a longitudinally divided sleeve common to all of said bearings therein, and a transversely and longitudinally divided bushing on said crank pin in said sleeve, the parts of which bushing are movable longitudinally in opposite directions upon said pin in contact with said sleeve.

3. The combination with a crank pin and a pair of connecting rods formed with end bearings and provided with bearing caps, one of said connecting rods being forked at its bearing end to embrace the bearing end of the other rod, of a longitudinally split sleeve extending through all of said bearings, and surrounding the crank pin, and a bushing on the pin supporting the sleeve and adjustable therein to take up the lost motion caused by wear between the bushing and pin.

4. The combination with a pair of connecting rods having end bearings and bearing caps, one of said connecting rods being forked at its bearing end to embrace the bearing end of the other rod, of a split sleeve extending through all the said bearings and forming a member upon the exterior of which the embraced rod turns, said sleeve being interiorly tapered, an exteriorly tapered bushing in said sleeve divided longitudinally and adapted to be moved longitudinally in contact with the tapering surface of the sleeve to adjust the same into contact with the crank pin extending therethrough.

5. The combination with a pair of connecting rods having end bearings and caps for said bearings, one of said rods being forked at its bearing end to embrace the bearing end of the other rod, of a longitudinally split sleeve extending through all of said bearings, said sleeve having a bore of greatest diameter, intermediate its ends forming inclined surfaces extending inwardly from the ends, and a bushing comprising a pair of split members each exteriorly tapered to engage the tapering surfaces of the sleeve and adapted to be adjusted in contact therewith longitudinally toward and from each other to adjust the same into contact with a crank pin adapted to extend therethrough.

In testimony whereof I affix my signature in presence of two witnesses.

WILLIAM CAMPBELL MOORE.

Witnesses:
 LEWIS C. FLANDERS,
 ANNA M. DORR.